United States Patent [19]

DeRossi

[11] 3,915,744
[45] Oct. 28, 1975

[54] ELECTRIC BATTERY

[75] Inventor: Mario DeRossi, Rome, Italy

[73] Assignee: Consiglio Nazionalle delle Ricerche, Rome, Italy

[22] Filed: Jan. 3, 1974

[21] Appl. No.: 430,411

Related U.S. Application Data

[62] Division of Ser. No. 283,488, Aug. 24, 1972, Pat. No. 3,811,945.

[30] Foreign Application Priority Data

Aug. 31, 1971 Switzerland................... 12758/71

[52] U.S. Cl. .................. 136/10; 136/30; 136/100; 136/155
[51] Int. Cl.² ....................................... H01M 39/06
[58] Field of Search ............................. 136/10–12, 136/100, 30, 160–162, 155

[56] References Cited
UNITED STATES PATENTS

| | | | |
|---|---|---|---|
| 1,499,907 | 7/1924 | Brown............................. | 136/10 X |
| 3,167,456 | 1/1965 | Schilke et al. .................... | 136/10 |
| 3,359,136 | 12/1967 | Merten et al. .................... | 136/30 |
| 3,382,102 | 5/1968 | Zito, Jr. ........................... | 136/30 |
| 3,390,014 | 6/1968 | Eisler............................... | 136/10 X |
| 3,408,232 | 10/1968 | Blue et al.......................... | 136/30 |
| 3,728,158 | 4/1973 | Poe et al........................... | 136/10 |

Primary Examiner—John H. Mack
Assistant Examiner—C. F. Lefevour
Attorney, Agent, or Firm—D. Paul Weaver

[57] ABSTRACT

An electric battery is disclosed comprising a plurality of cells arranged in series, each cell comprising an aqueous electrolyte of zinc bromide circulated through the cells during charging and discharging, a bipolar electrode having a zinc anode deposited on one side and a bromine cathode and active cathodic mass on the other side. The active cathodic mass contains an active cathodic substance which is substantially insoluble in water and which is capable of combining with cathodic bromine to form solid addition products. Additive substances are dissolved in the electrolyte to reduce the solubility of the active cathodic substance, to increase the conductivity and acidity of the electrolyte, and to encourage the zinc to deposit in a thin and uniform layer.

5 Claims, 7 Drawing Figures

ELECTRIC BATTERY

PRIOR RELATED APPLICATION

This is a division of application Ser. No. 283,488, filed Aug. 24, 1972 now U.S. Pat. No. 3,811,945.

BACKGROUND OF THE INVENTION

This invention relates to electric batteries.

A battery is known which has a zinc electrode and a bromine electrode between which is an aqueous electrolyte of zinc bromide.

This type of battery has a high theoretic specific energy (i.e. high energy per unit mass). The battery may, therefore, have a specific energy of more than 430 Wh/kg (Wh/kg = watt hours per kilogram) and will produce an e.m.f. of about 1.80 volts per cell.

The working of such a battery takes place according to the following electrochemical reactions:

at the anode $Zn \rightarrow Zn^{++} + 2e$ at the cathode $Br_2 + 2e \rightarrow 2Br^-$ the circuit being completed within the cell by two electrodes made of conductive material which do not participate in the electrochemical reaction. During the charging process a deposit of zinc is formed at the anode and there is a discharge of free bromine at the cathode.

During the discharge process zinc dissolves in the electrolyte, the free bromine which had accumulated at the cathode is ionized and, as a result, the aqueous electrolyte is enriched with a concentration of zinc bromide.

The above account describes the working of the battery in theory. In practice, there are two important drawbacks which may be summed up as follows:

A. BROMINE CATHODE

Bromine is not very soluble in water (about 3%) but the presence of zinc bromide in the electrolyte causes the solubility of the bromine to rise to about 50%.

A zinc anode reacts very quickly with an electrolyte containing a high percentage of bromine and is liable to cause auto-discharge of the cell and very low charge efficiency.

During the charging process the quantity of free bromine formed in the cell has, therefore, to be controlled very closely to prevent it from dissolving in the electrolyte.

The free bromine which is formed during the charging process has, therefore, to be captured and then released during the discharging process with a high restitution rate.

B. ZINC ANODE

Density gradients in the electrolyte cause a lack of uniformity in the deposit of the zinc on the anode (especially if this deposit is rather thick) and zinc dendrites soon appear, bringing about an internal short-circuit of the cells and thereby of the battery as a whole.

Several solutions to these drawbacks have been previously proposed.

In U.S. Pat. No. 3,382,102 there is a proposal to retain the free bromine by pulverulent active carbon contained in grooves made in a porous plate, made of carbon or graphite. However, carbon has a very low capacity for absorbing free bromine (about 1:1 by weight) and the restitution rate is also very slow. Furthermore, during the charging process, density gradients are formed both at the cathode and in the electrolyte. There results a lack of uniformity in the deposit of the zinc and rapid corrosion in the area where the free bromine is most concentrated.

U.S. Pat. No. 3,285,781 seeks to eliminate these density gradients in a battery having a zinc anode and a bromine cathode by placing horizontal insulating diaphragms between a carbon cathode and a zinc anode. But this does not prevent some free bromine from forming in the electrolyte during the charging process and this causes the battery to discharge itself.

British Pat. Specification No. 320,916 and U.S. Patent No. 3,328,202 suggest the use of powdered carbon to retain the free bromine. This results in the same drawbacks as have already been mentioned above.

The present applicant has proposed in his British Pat. Specification No. 1,234,414 the use of organic solvents (such as $CHBr_3$, $CCl_4$, $CS_2$, etc.) in place of carbon to retain the free bromine. Although this solution is technically valid it causes the weight of the battery to be increased.

A better solution is proposed in U.S. Pat. No. 2,566,114 where it is suggested that alkylammonium halide, for example tetramethylammonium bromide (hereinafter referred to as TMABr) be added to the powdered carbon surrounding the cathode. The TMABr serves to form reversible addition products with the free bromine by retaining it in high proportions (moles of free bromine: moles of TMABr = 4:1 or more).

The drawback inherent in this solution is that not all of the intermediate addition products which are formed between the bromine and the alkylammonium halides during the charging process are in a solid state and this results in addition products rich in bromine flowing along the cathode thus causing a lack of uniformity in the capacity of the cathode. Another drawback is that the electrolyte contains free bromine and there ensues a more or less rapid auto-discharge of the battery and corrosion of the zinc anode. The problem of density gradients in the electrolyte also remains unsolved.

Alkylammonium halides are generally very soluble in water, and are partially ionised in the aqueous electrolyte. In the cae of bromine the first addition product formed with the alkylammonium halide during the charging process is produced mainly on the surface of the cathode and prevents it from absorbing further quantities of free bromine.

On the other hand, experiments have shown that each mole of alkylammonium halide is capable of absorbing several moles of free bromine with reactions of the following type:

$(TMA^+ + Br^-) + Br_2 \rightarrow TMA^+ + Br_3^-$ TMABr$_3$ solid↓

$(TMA^+ + Br_3^-) + 3Br_2 \rightarrow TMA^+ + Br_9^-$ TMABr$_9$ solid↓

With TMABr solid TMABr$_3$ is formed first, then liquid eutectic mixtures and then, finally, solid TMABr$_9$. Thus, during the charging and discharging processes, the addition products are liquid for a time and flow down the cathode; the distribution of the capacity of the cathode and anode is, therefore, not uniform.

As a result, the discharge potentials are different, and during both the charging and discharging processes, the e.m.f. increases or decreases in steps.

The present applicant proposes in his British Pat. Specification No. 1,237,964 the use of tetralkylammonium perchlorate in the form of a paste in contact with the cathode. The use of tetramethylammonium perchlorate (herein referred to as $TMAClO_4$) instead of alkylammonium halide has two great advantages. Firstly, once the $TMAClO_4$ has been introduced into the cathode, it hardly dissolves in the electrolyte whilst adding perchlorates, for example sodium perchlorate, to the electrolyte makes the $TMAClO_4$ even less soluble. As a result, the addition product which is formed with the free bromine during the charging process is evenly distributed within the interior of the cathode and not only on the surface. The second advantage lies in the fact that as $TMAClO_4$ causes the formation of only one solid additive, $TMABr_9$, and avoids the steps in the e.m.f. which are characteristic when using alkylammonium halide.

Other substances as well as alkylammonium halides are capable of forming additional products with free bromine (see U.S. Pat. No. 3,057,760) but they require special means to put them into practice.

The present invention seeks to provide a battery without the aforementioned disadvantages.

SUMMARY OF THE INVENTION

The present invention is directed toward a battery including a plurality of cells arranged in series, each cell comprising: a bipolar electrode which serves to separate neighboring cells; an aqueous electrolyte of zinc bromide which is continuously circulated through the cells during the charging and discharging processes, and stored in an autonomous tank when the battery is not in use; the bipolar electrode having deposited on one side a zinc anode and on the other side a bromine cathode including an active cathodic mass, the active cathodic mass containing an active cathodic substance which is substantially insoluble in water and which is capable of combining with cathodic bromine to form solid addition products, the active cathodic substance being selected from at least one of the group comprising alkylammonium perchlorate, diamine bromides, diamine perchlorates, triamine bromides and triamine perchlorates, additive substances being dissolved in the electrolyte to reduce the solubility of the active cathodic substance, to increase the conductivity and the acidity of the electrolyte and to encourage the zinc to deposit in a thin and uniform layer.

BRIEF DESCRIPTION OF THE DRAWINGS

The invention is illustrated, merely by way of example, in the accompanying drawings, in which:

In the drawings like parts have been given the same reference numerals throughout.

Referring to the drawings, in toto, the parts will be listed and described briefly. Their interrelated functions will be described in more detail in the preferred embodiments. In the drawings like parts have been given the same reference numerals throughout the figures.

Referring to FIG. 2, it will be seen that the bipolar electrode of the present invention is constituted by an impermeable electrically conducting membrane 1, bonded by a thin layer of graphite cement 2 to a layer of porous graphite felt 3. On the other side of the membrane is a layer 4 of zinc deposited to form an anode. Retaining means for the graphite cement and the porous graphite felt is shown at 5.

Referring to FIG. 3, a thin metal sheet 6 may be used as a membrane rather than graphite fibers. The metal sheet is conductive and is coated on either side with a layer 2 of graphite cement. Instead of the graphite felt 3 of FIG. 2, short sticks of electrographite 7 may be gluded onto the graphite covered metal sheet to form grooves or channels 8 which hold an active cathodic mass made of paste. A retaining ring 5 and a porous, insulating partition 9 holds the active cathodic mass in place.

Referring to FIG. 1, an impermeable sheet of moulded graphite resin (10) may be used to replace the membrane 1 or the graphite covered sheet 6 of FIGS. 2 and 3, respectively. The bipolar electrode is fitted into a chassis 12 of which it constitutes one of the side walls. The wall of the opposite side remains open, being covered, during assembly, by the bipolar electrode of the neighboring cell. Thus, the electrolytic zone 13 is defined between two neighboring bipolar electrodes and is bounded by a part of the chassis 12. In large cells thin reinforcement elements 14 may be placed within the electrolytic zone 13.

Figure 1:
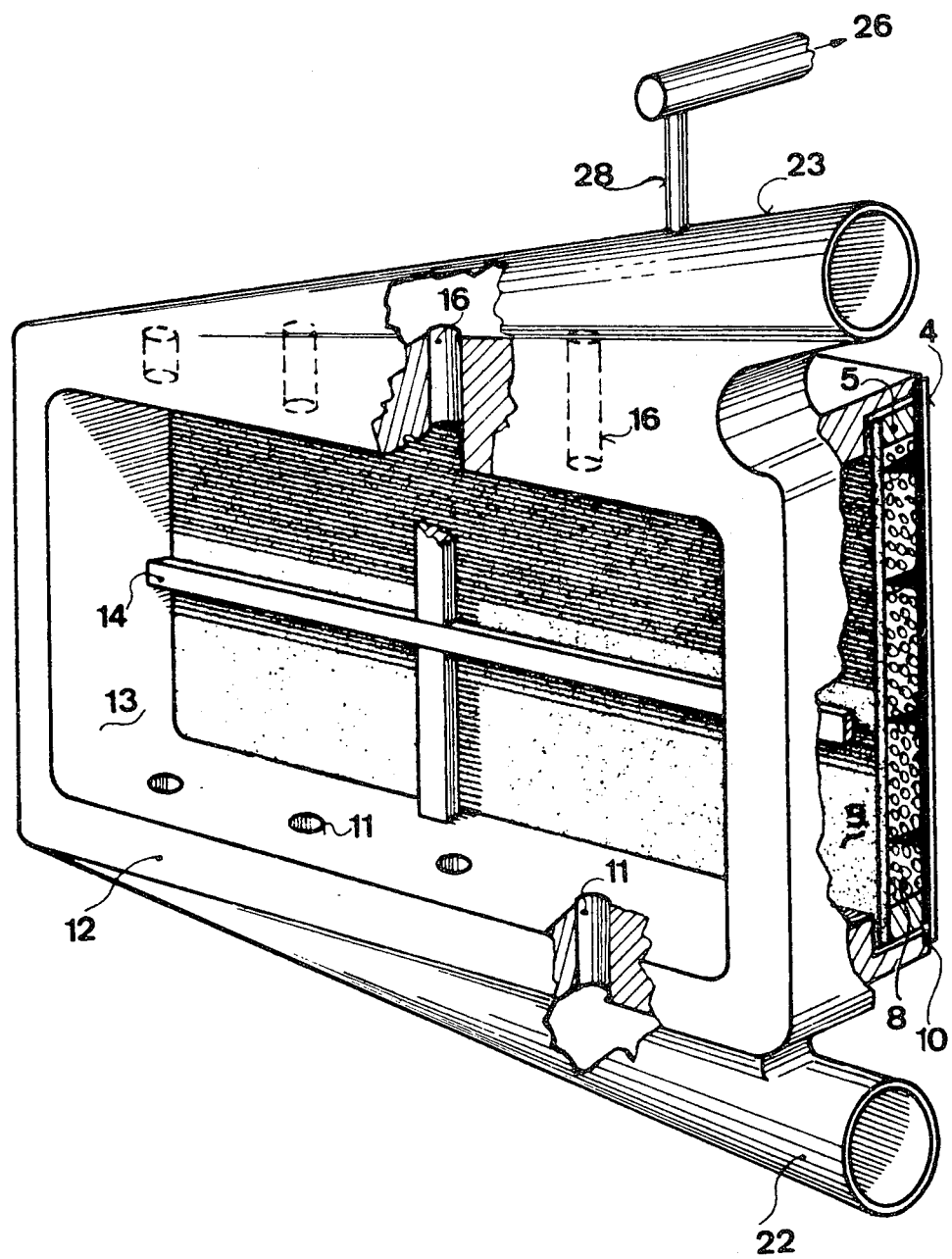
FIG. 1 shows a perspective view, partially cut-away, of a cell of a battery according to the present invention.

The electrolyte leaves the electrolytic zone 13 through a series of holes, 11 and 16, which traverse the upper and lower walls respectively of the chassis 12, the holes leading from and to collecting pipes 22, 23 respectively.

The cells 15 are arranged in series. The first cell of the battery is closed by a conductive wall on which the layer 4 of zinc is deposited and which is in electrical connection with the negative terminal 27 of the battery.

Figure 4:
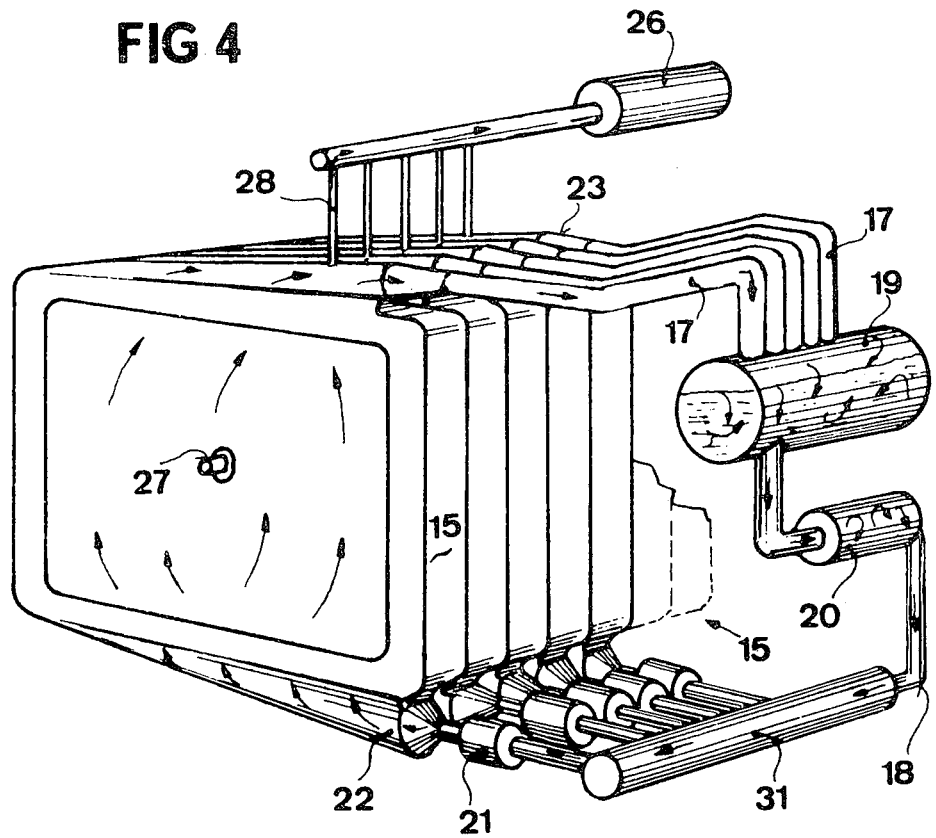
FIG. 4 shows a partial perspective view of a battery according to the present invention.

Referring to FIG. 4, each of the pipes 23 which carry the electrolyte away from the cells is connected to the top of the tank 19 by individual conduits 17. A single pump 20 serves to draw the electrolyte out of the tank 19 and to supply it via a discharge conduit 18 and a distributing channel 31 to the pipes 22 from whence it is fed into the cells. A filter 21 is inserted between the channel 31 and each of the pipes 22 which eliminates any solid particles which may have entered the electrolyte and causes a break in the electrical conductivity of the flow of the electrolyte and prevents the cells 15 from being short circuited.

Figure 5:
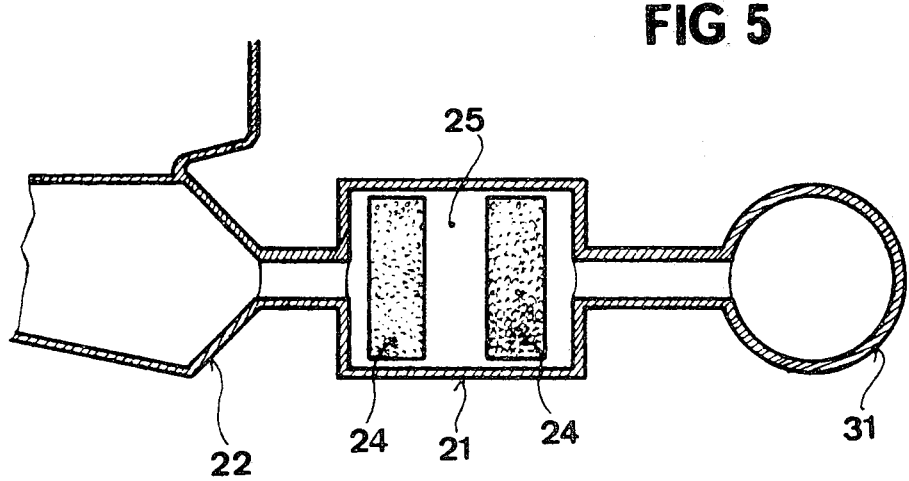
FIG. 5 shows a cross-sectional view of a filter for the battery illustrated in FIG. 4.

Referring to FIG. 5, the filter 21 is constituted by a holder 25 into which porous diaphragms 24 are inserted; the diaphragms 24 increase the electrical resistance of the jet of electrolyte by a factor of about 5.

Referring to FIG. 4, the top of each cell 15 is linked to a small bore tube 28 which collects any gas which may have formed to diminish the risk of a lack of uniformity in the deposit of zinc. The gas is removed by means of a small, intermittently operating, pneumatic pump.

Figure 6:
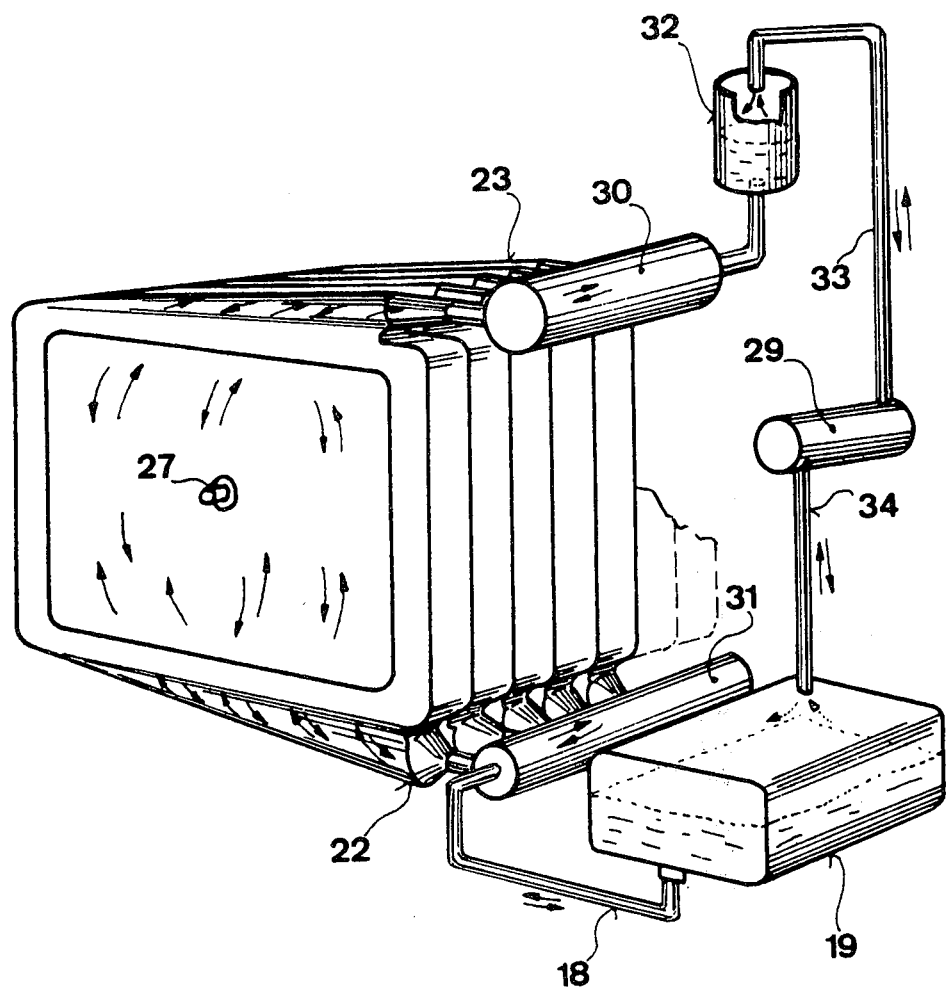
FIG. 6 shows a perspective view of another embodiment of a battery according to the present invention.

In another embodiment of a battery according to the present invention and shown in FIG. 6, the electrolyte is circulated by a single pneumatic pump 29. The upper pipes 23 lead into a tube 30 which, in turn, leads to an overflow tank 32. The pipes 22 lead to the channel 31 which is linked via the conduit 18 with the tank 19. The pneumatic pump 29 works by alternately sucking and pumping (with a cycle of between 1 and 5 minutes) the electrolyte in the tank 19 via a channel 34 so that the electrolyte is forced into the zones 13 of the cells 15 and then withdrawn therefrom. The pump 29 sucks electrolyte from the overflow tank 32 via a channel 33. In this embodiment there is no need to provide pipes to extract gas bubbles formed in the electrolyte, since the pump 29 will also withdraw any bubbles of gas that may have formed in the cells 15.

DESCRIPTION OF THE PREFERRED EMBODIMENTS

The battery according to the present invention comprises a plurality of cells 15 arranged in series (cf. FIGS. 4 and 6). Each cell contains a bipolar electrode which defines one wall of a zone 13 for electrolyte (FIG. 1), the opposite wall (not shown) being defined by the bipolar electrode of the adjacent cell.

Figure 2:
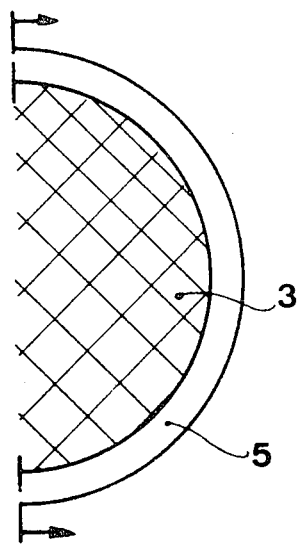
FIGS. 2 and 3 represent a schematic section of two possible embodiments of a bipolar electrode for a battery according to the present invention.
Figure 2:
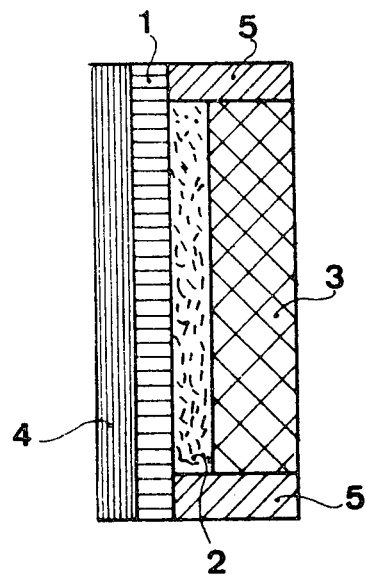

Referring to FIG. 2, the layer of porous graphite felt is impregnated with at least one active cathodic substance which is such as to form solid addition products with the free bromine in the cell; the active cathodic substances, listed below, may be used separately or in combination:

tetramethylammonium perchlorate (TMAClO$_4$)
tetraethylammonium perchlorate
tetrabutylammonium perchlorate
phenyltrimethylammonium perchlorate and/or bromide
cetyltrimethylammonium perchlorate and/or bromide
hexamethonium perchlorate and/or bromide
decamethonium perchlorate and/or bromide and in accordance with the theoretical basis of the present invention, none of these substances dissolves easily in water (for example, TMAClO$_4$ has a solubility of 0.4 grams in 100 grams of water), and all form addition products with bromine.

The above-mentioned active cathodic substances have been examined according to the following criteria:

a. to check whether the active cathodic substance gives a solid addition product with bromine;

b. to establish the number of moles of free bromine retained by each mole of the active cathodic substance; and c. to check the restitution rate at the bromine cathode, that is to say whether the free bromine is more or less easily liberated by the active cathodic substance.

According to the present invention, it has been established that, from the point of view of criteria (a) and (b), the best results were obtained with TMAClO$_4$ and hexamethonium bromide (herein referred to as ExhBr). These form solid addition products, and retain high quantities of moles of free bromine but from the point of view of criteria (c) are very different, as may be seen from their discharge curves in a cell having a bromine cathode.

Figure 7:
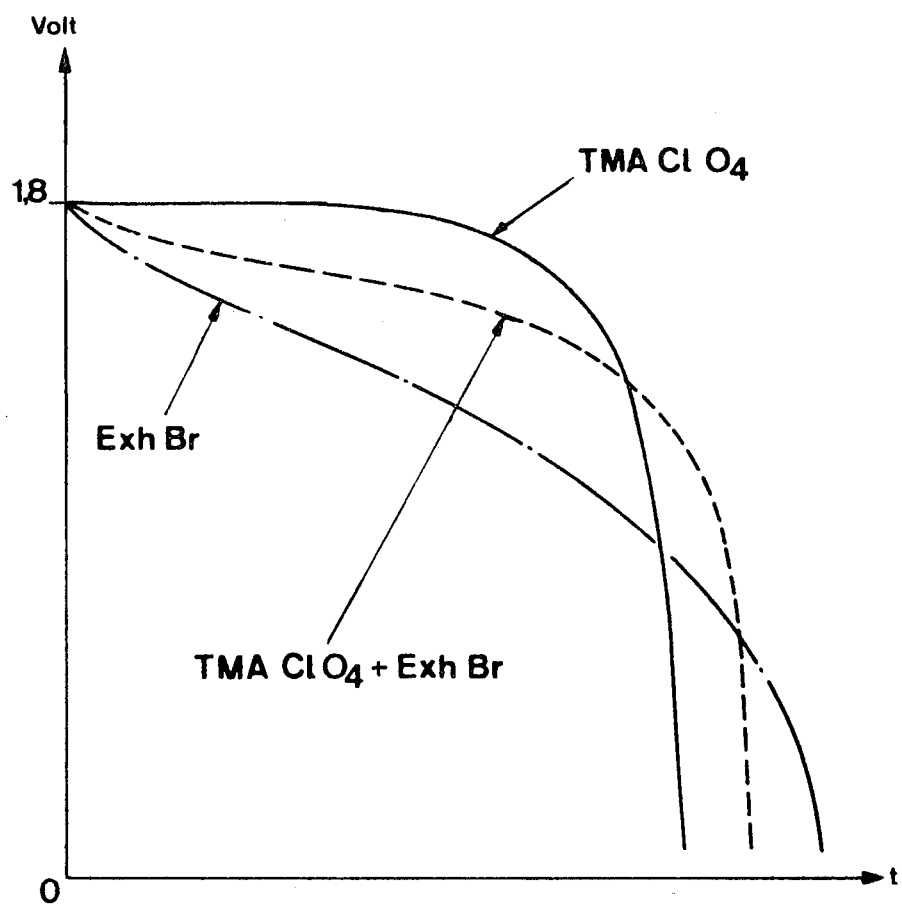
FIG. 7 represents the voltage/time curves of three active cathodic substances for a battery according to the present invention.

This will be immediately apparent from FIG. 7 which shows the discharge curve of a cell containing TMAClO$_4$ and that of a cell containing ExhBr. The latter retains more moles of free bromine — which gives the cell or the battery a greater specific capacity — but the restitution rate is slower and this results in the descending discharge curve.

TMClO$_4$, however, has a more linear curve but its specific capacity is less as it becomes discharged more rapidly.

FIG. 7 also prevents the curve obtained by mixing the two substances, and it will be seen that this curve lies between that of the TMAClO$_4$ and that of the ExhBr.

Depending on the use to which the battery is to be put, one or the other of these active cathodic substances or a mixture of the two in appropriate proportions may be chosen. According to the active cathodic substance chosen, the discharging characteristics of a given cell will be different in accordance with the type of battery desired.

The impregnation of the layer 3 with the chosen active cathodic substance is carried out by a process of exchange with a salt soluble in water. For example, when TMAClO$_4$ is used the process is as follows:

A solution of an alkylammonium halide, e.g., tetramethylammonium bromide, hereinafter referred to as TMABr, which is easily dissolved in water, is made up and the layer 3 is impregnated with the solution; the TMAClO$_4$ is then precipitated by adding a water soluble perchlorate (e.g., sodium perchlorate) according to the following reaction:

TMABr + NaClO$_4$ TMAClO$_4$ + NaBr after which the sodium bromide, which is very soluble in water, is removed by washing, leaving the layer 3 impregnated with a uniform dispersion of the relatively insoluble TMAClO$_4$.

The impermeable conducting membrane 1 may preferably be constructed of graphite fibers, examples of which are tabulated below:

TABLE

| No. | Type of Graphite and Commercial Name | Specific Weight in gr/cm$^3$ | Resistance In mm$^2$/m | Weight of Electrode in dm$^2$/g | Thickness of Electrode (mm) |
|---|---|---|---|---|---|
| 1 | Impermeable membrane 1 SIGRAFLEX (Trade Mark) | ~1 | 40,000 | 1.6–3.2 | 0.15–0.3 |
| 2 | Layer 3 of SIGRATHERM (Trade Mark) | ~0.05 | — | 2–3 | 2–4 |
| 3 | Layer 2 of Graphite cement SIGRADUR N.6 (Trade Mark) | ~1.5 | 20–50 | 4–25 | 0.3–2 |

TABLE—Continued

| No. | Type of Graphite and Commercial Name | Specific Weight in gr/cm³ | Resistance In mm²/m | Weight of Electrode in dm²/g | Thickness of Electrode (mm) |
| --- | --- | --- | --- | --- | --- |
| 4 | Electrographite ELECTROCARBONIUM 470 (Trade Mark) | 1.8 | 10 | 70–140 | 4–8 |

Figure 3:
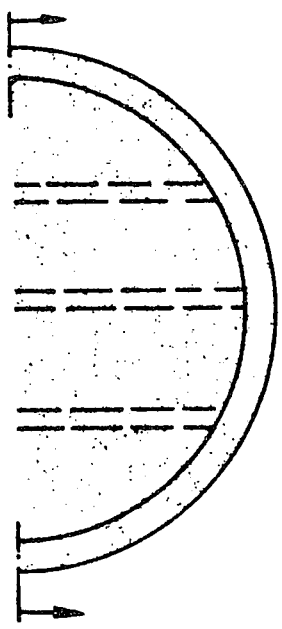
Figure 3:
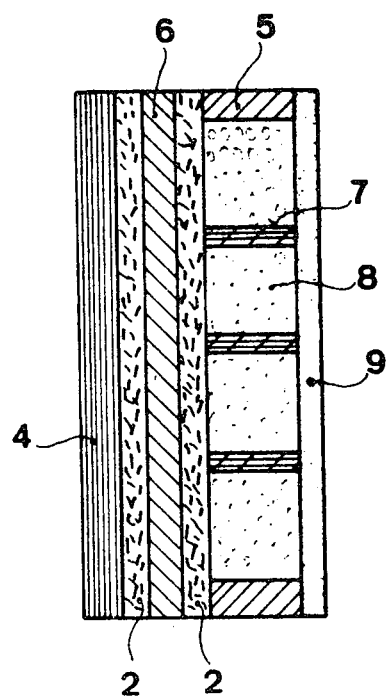

Instead of the membrane being of graphite fibres - which is technically excellent but costly — a thin metal sheet 6 may be used (see FIG. 3). The sheet should be conductive and may be made of iron coated on either side with a layer 2 of graphite cement (composed of graphite and resin) which has been cured or coked so as to achieve a graphite covered metal sheet.

On one side of the graphite covered metal sheet is applied a layer of porous graphite felt impregnated as hereinbefore described with reference to FIG. 2, whilst the other side is ready to receive the layer 4 of zinc.

Instead of the graphite felt 3 of FIG. 2 short sticks of electrographite (see FIG. 3) may be glued onto the graphite covered metal sheet with graphite cement to form grooves or channels 8 in which may be placed an active cathodic mass made of paste comprising, for example, graphite powder, an active cathodic substance ($TMAClO_4$) and an inert powder of porous carbon. A retaining ring 5, preferably made of plastics material, and a porous, insulating partition 9 holds in place the active cathodic mass which could or might otherwise escape.

The respective quantities of the constituents of the active cathodic mass are not critical. However, it has been established by experiment that the optimum values vary according to the use to which the battery is to be put. The following ratios are given by way of example:

a. graphite paste : Active cathodic substance : porous carbon = 3 : 3 : 5 (ratio by weight)
b. graphite paste : active cathodic substance : porous carbon = 1 : 1 : 1 (ratio by weight)

The weight of the bipolar electrode shown in FIG. 3 is greater than that of the bipolar electrode shown in FIG. 2 but it is much less expensive to manufacture. Technically, the solutions are equally valid so that the choice between the two will be dictated by criteria of price and weight according to the application to which the battery is to be put.

In place of the membrane 1 (see FIG. 2) or the graphite covered sheet 6 (see FIG. 3) an impermeable sheet or plate of moulded graphite resin 10 (FIG. 1) may be used. The graphite resin employed may be that sold under the Trade Mark SIGRADUR N.6, the characteristics of which are given in the foregoing Table. In the embodiment illustrated in FIG. 1, the sheets of moulded graphite resin 10 are smooth on one side to receive the layer 4 of zinc while the other side is furnished with diaphragms which form channels 8'; these channels 8' are produced by a moulding process. Of course, the graphite resin may be smooth on both sides and have a layer of porous graphite felt, similar to the layer 3, on one side and the layer 4 of zinc on the other.

The bipolar electrode of the present invention will always be of a sandwich construction, one layer of which will always be constituted by a layer of zinc that is deposited during a charging process. According to the present invention, the deposit of zinc is extremely thin having a thickness of a few hundredths of a millimeter, for example between 3/100 and 10/100 mm and preferably about 7/100 mm. Such a thickness precludes the formation of dendritic deposits. In the present invention this is obtained by carrying out the charging and discharging processes under conditions of a slight insufficiency of zinc. The desired thickness is obtained, within the cells of the battery of the present invention, by the fact that the capacity of the battery itself is limited by the bromine cathode to 3–5 $ah/dm^2$ (amp hours per square decimeter). The quantity of zinc that is deposited may be established as follows: (electrochemical equivalent of zinc) × (the maximum number of $Ah/dm^2$) × efficiency. The efficiency being about 90%, this calculation gives the figure of about 5 grams of zinc. This quantity of zinc corresponds to about 0.7 $cm^3$ of zinc distributed over an area of 1 $dm^2$ with a thickness of about 7/100 mm.

Furthermore, the formation of zinc dendrites is avoided as the surface on which the zinc is deposited is perfectly smooth, being free of the irregularities customarily found in conventional zinc batteries.

The bipolar electrode hereinbefore described is fitted into a chassis 12 (see FIG. 1) of which it constitutes one of the side walls, while the wall of the opposite side remains open, being covered, during assembly, by the bipolar electrode of the neighboring cell. Thus, the zone 13 is defined between two neighboring bipolar electrodes and is bounded by a part of the chassis 12.

In large-sized cells thin reinforcement elements 14, preferably made of plastics material, may be placed within the zone 13.

The electrolyte enters and leaves the zone 13 through a series of holes 11, 16 which traverse the upper and lower walls respectively of the chassis 12 (as seen in FIG. 1), the holes leading from and to collecting pipes 22, 23 respectively. It matters little whether the electrolyte circulates upwardly or downwardly through the cell or alternately in each direction.

The electrolyte is formed of an aqueous solution of zinc bromide with a weight ratio of water to bromine of about 100:100.

To the aqueous solution of zinc bromide is added:
1. BROMIC ACID (HBr)

Bromic acid is added to increase the conductivity and acidity (pH between 0 and 1) in order to avoid the formation of zinc hydroxide which would otherwise cause the solution to turn cloudy and eventually form an undesirable precipitate. The bromic acid is also intended to compensate for the loss of free bromine due to the small amount of free bromine which is retained by all the inactive parts of the battery (i.e. the chassis 12, the retaining ring 5, the partition 9 and the pipes 22, 23 etc.).

The presence of the bromic acid causes a slight reduction in the charge efficiency; this in turn means that there is a slight insufficiency of zinc compared with that determined by the stoichiometric conditions of working, and promotes an even deposit of zinc as mentioned above.

2. A DUAL PURPOSE SALT

The dual purpose salt serves to maintain the conductivity of the electrolyte at an adequate level when, towards the end of the charging process, almost all the zinc bromide has disappeared, and to maintain in solution ions which prevent free bromine from dissolving in water. A salt which fulfils those purposes well is sodium sulphate, its $SO_4^=$ ions are very good at preventing free bromine from dissolving in water.

3. AN ADDITIONAL SALT

The solubility of the active cathodic substance used to create solid addition products with the cathodic bromine is already low but it may be reduced still further by adding an additional salt. This additional salt may also function to maintain the conductivity of the electrolyte at an adequate level towards the end of the charging process, thus reinforcing the effect of the dual purpose salt. When the active cathodic substance is $TMACIO_4$ a salt which fulfils this purpose very well is sodium perchlorate ($NaClO_4$).

A preferred composition for the electrolyte is given below:

| | |
|---|---|
| Water | 100 parts by weight |
| zinc bromide | 100 parts by weight |
| bromic acid | 3 parts by weight |
| sodium sulphate | 7 parts by weight |
| sodium perchlorate | 14 parts by weight |
| total electrolyte: | 224 parts by weight |

During both the charging and discharging processes, the electrolyte is circulated continuously through the zone 13 of each individual cell. This avoids the formation of undesirable density gradients and means that the electrolyte can be evacuated from the zone 13 whenever the battery is not in use. During these periods of inactivity the electrolyte is stored in a separate tank 19 (see FIGS. 4 and 6).

The cells 15 as mentioned before are arranged in series (see FIG. 4). The first cell of the battery is closed by a conductive wall on which the layer 4 of zinc is deposited and which is in electrical connection with the negative terminal 27 of the battery.

This first cell and its immediate neighbor are hermetically separated by the bipolar electrode; the same applies to each pair of adjacent cells. The last cell has an electrode which serves as a unipolar cathode and is electrically connected to the positive terminal (not shown) of the battery.

Each of the pipes 23, which carry the electrolyte away from the cells, is connected to the top of the tank 19 by individual conduits 17. By this means no one particular cell can come into electrical contact with a neighboring cell or cells via the electrolyte as the electrical conductivity is broken by the jet of electrolyte falling into the tank 19.

A single pump 20 serves to draw the electrolyte out of the tank 19 and to supply it via a discharge conduit 18 and a distributing channel 31 to the pipes 22 from whence it is fed into the cells.

Between the channel 31 and each of the pipes 22 is inserted a filter 21 which serves two purposes: first, it eliminates any solid particles which may have entered the electrolyte; and second, it causes a break in the electrical conductivity of the flow of the electrolyte and prevents the cells 15 from being short circuited.

In the embodiment illustrated in FIG. 5, the filter 21 is constituted by a holder 25 into which porous diaphragms 24 are inserted; the diaphragms 24 increase the electrical resistance of the jet of electrolyte by about five times.

It will be appreciated that similar filters may be placed at the exit of the pipes 23 which could then be connected to a single conduit leading to the tank 19.

During the charging and discharging processes bubbles of gas (especially bubbles of hydrogen) are liable to form and cling to the surface of the layer 4 of zinc and to the partition 9. Such bubbles have an adverse influence as they make it more difficult for the electrolyte to reach all the active cathodic material and cause a lack of uniformity in the deposit of zinc. To diminish the risk of this occurring, the top of each cell 15 is linked to a small bore tube 28 which collects any gas which may have formed. This gas is removed by means of a small intermittently operating pneumatic pump 26 (see FIGS. 1 and 4).

In another embodiment of a battery according to the present invention and shown in FIG. 6, the electrolyte is circulated by a single pneumatic pump 29. The upper pipes 23 lead into a tube 30 which, in turn, leads to an overflow tank 32. The pipes 22 lead to the channel 31 which is linked, via the conduit 18, with the tank 19. The pneumatic pump 29 works by alternately sucking and pumping (with a cycle of between 1 and 5 minutes) the electrolyte in the tank 19 via a channel 34 so that the electrolyte is forced into the zones 13 of the cells 15 and then withdrawn therefrom. The pump 29 sucks electrolyte from the overflow tank 32 via a channel 33.

The advantage of this embodiment lies in the fact that there is no need to provide pipes 28 to extract gas bubbles formed in the electrolyte since the pump 29 will also withdraw any bubbles of gas that may have formed in the cells 15.

The advantages of the batteries according to the present invention described above are:

a. a very high specific energy of more than 100 Wh/kg;

b. the bromine which is formed during the charging process is captured and reversibly retained with a rapid restitution rate;

c. all the free bromine is concentrated in the active cathodic substance, uniformly distributed, the addition products that are formed all being solid which, therefore, precludes all possibility of their flowing away;

d. the percentage of free bromine in the electrolyte is very low (less than 0.2%) which means that high charge efficiency can be obtained.

e. no density gradients are formed in the electrolyte during the charging process; the layer of zinc is therefore deposited perfectly uniformly and exempt from dendritic formations;

f. none of the free bromine that is captured can escape through the walls of the bipolar electrode and cause an internal short circuit of the battery; and g. the intimate contact between the bromine and the active cathodic substance diminishes the electrical resistance of the bipolar electrode.

What is claimed is:

1. An electric battery comprising a plurality of cells arranged in series, each cell comprising a bipolar electrode between neighboring cells, said bipolar electrode having deposited on one side a zinc anode and on the other side a bromine cathode including an active cathodic mass, said active cathodic mass containing an active cathodic substance, said active cathodic substance being substantially insoluble in water and capable of combining with cathodic bromine to form solid addition products and selected from the group consisting of tetramethylammonium perchlorates, tetraethylammonium perchlorates, tetrabutylammonium perchloates, phenyltrimethylammonium perchlorates, phenyltrimethylammonium bromides, cetyltrimethylammonium perchlorates, cetyltrimethylammonium bromides, hexamethonium perchlorates, hexamethonium bromides, decamethonium perchlorates, decamethonium bromides, and mixtures thereof, and an aqueous electrolyte of zinc bromide, wherein each cell includes an insulating plastic chassis, one wall of said chassis being formed by the bipolar electrode, said chassis having a plurality of holes therethrough for supplying electrolyte to, and withdrawing electrolyte from, the cell.

2. The electric battery of claim 1 wherein the chassis has at least one hole communicating with a pump to evacuate gas formed in the cell.

3. The electric battery of claim 1 wherein a pump is provided to withdraw electrolyte from the cells and return electrolyte to the cells, and a filter means to filter the electrolyte.

4. The electric battery of claim 3 wherein the filter means comprises a plurality of filters, each of said filters having a filter holder having at least one porous diaphragm arranged to increase the electrical resistance to the flow of the electrolyte.

5. The electric battery of claim 3 wherein the pump is a pneumatic pump which communicates with a storing means for storing electrolyte when the battery is not in use.

* * * * *